(12) United States Patent
Daikuhara et al.

(10) Patent No.: US 8,641,299 B2
(45) Date of Patent: Feb. 4, 2014

(54) OPTICAL CONNECTOR

(75) Inventors: Osamu Daikuhara, Shinagawa (JP);
Yuko Ikeda, Shinagawa (JP); Shigeyuki Takizawa, Shinagawa (JP); Toshio Hashi, Shinagawa (JP); Toshihiro Kusagaya, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 382 days.

(21) Appl. No.: 12/639,091

(22) Filed: Dec. 16, 2009

(65) Prior Publication Data

US 2010/0215312 A1    Aug. 26, 2010

(30) Foreign Application Priority Data

Feb. 26, 2009    (JP) ................................. 2009-043906

(51) Int. Cl.
*G02B 6/36*    (2006.01)

(52) U.S. Cl.
USPC ........................................................... 385/93

(58) Field of Classification Search
None
See application file for complete search history.

(56) References Cited

U.S. PATENT DOCUMENTS

| | | | |
|---|---|---|---|
| 6,374,004 B1 * | 4/2002 | Han et al. ........................ | 385/14 |
| 6,488,417 B2 * | 12/2002 | Kropp .............................. | 385/88 |
| 6,793,406 B1 * | 9/2004 | Edwards et al. ................. | 385/88 |
| 6,908,232 B2 * | 6/2005 | McColloch et al. ............. | 385/53 |
| 7,364,370 B2 * | 4/2008 | Nishizawa et al. .............. | 385/92 |
| 7,420,754 B2 * | 9/2008 | Nagasaka ...................... | 359/811 |
| 7,441,965 B2 | 10/2008 | Furuno et al. | |
| 2003/0113071 A1 * | 6/2003 | Kim et al. ........................ | 385/76 |
| 2004/0184707 A1 * | 9/2004 | Jewell et al. .................... | 385/14 |
| 2005/0036742 A1 * | 2/2005 | Dean et al. ...................... | 385/71 |
| 2005/0259927 A1 * | 11/2005 | Kato ............................... | 385/93 |
| 2006/0291777 A1 * | 12/2006 | Nishizawa et al. ............. | 385/33 |
| 2007/0267569 A1 * | 11/2007 | Ueno et al. ..................... | 250/216 |
| 2008/0007930 A1 | 1/2008 | Daikuhara et al. | |

FOREIGN PATENT DOCUMENTS

| | | |
|---|---|---|
| JP | 8-005872 | 1/1996 |
| JP | 09-243867 | 9/1997 |
| JP | 10-247741 | 9/1998 |
| JP | 11-168233 | 6/1999 |
| JP | 2001-116962 | 4/2001 |
| JP | 2004-109498 | 4/2004 |
| JP | 2004-219786 | 8/2004 |
| JP | 2004-272061 | 9/2004 |
| JP | 2006-309113 | 11/2006 |
| JP | 2008-015265 | 1/2008 |

* cited by examiner

*Primary Examiner* — Tina Wong
(74) *Attorney, Agent, or Firm* — IPUSA, PLLC

(57) ABSTRACT

An optical connector includes an optical element to be optically connected to an optical fiber; and an optical component. The optical component includes an element fixation part configured to fix the optical element to the optical component; a ferrule attachment part to which a ferrule having the optical fiber connected thereto is to be attached; and a lens to face the optical fiber when the ferrule is attached to the ferrule attachment part. The optical element is positioned relative to the optical fiber in response to attachment of the ferrule to the ferrule attachment part.

11 Claims, 9 Drawing Sheets

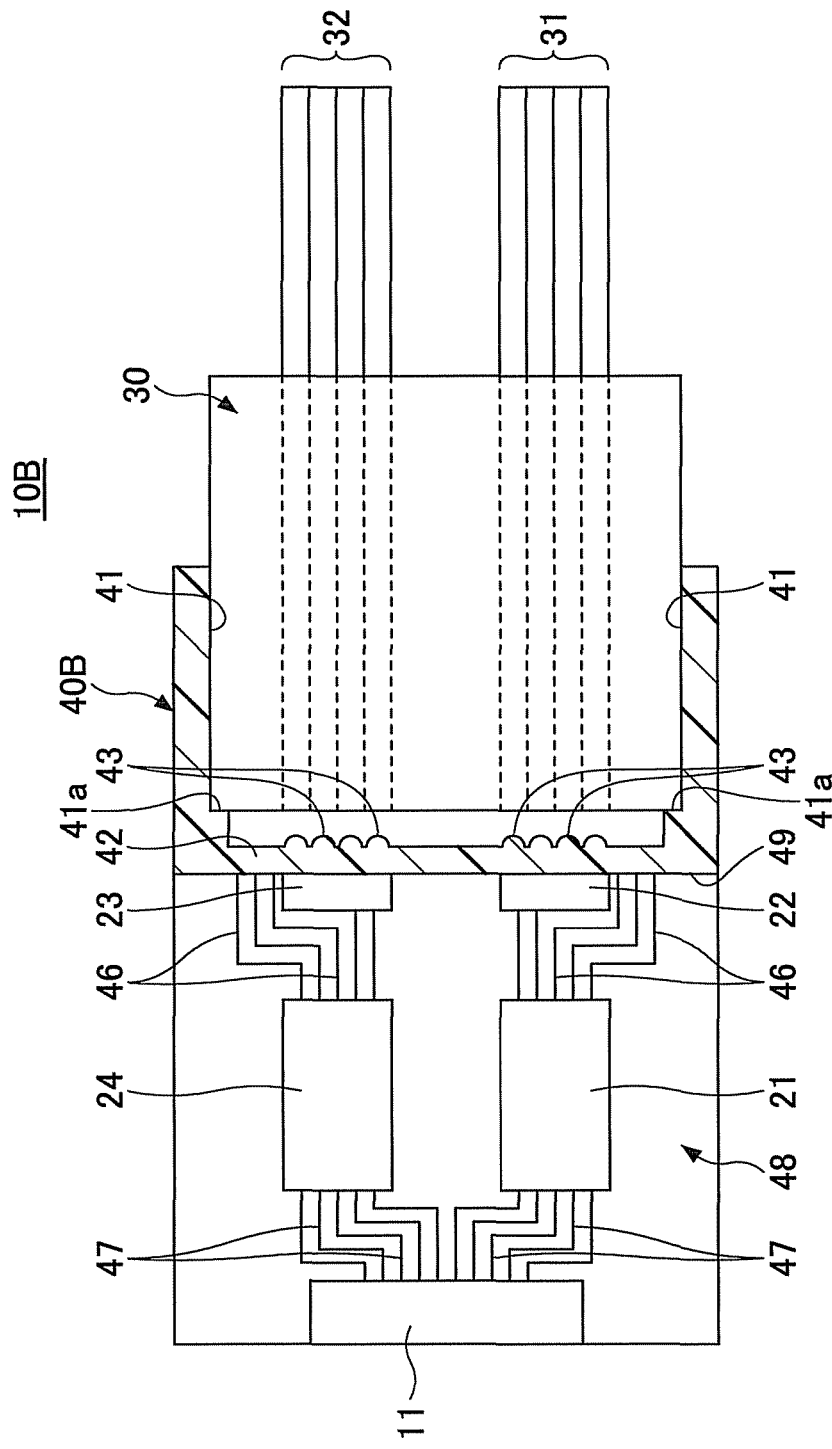

OPTICAL CONNECTOR

CROSS-REFERENCE TO RELATED APPLICATION

The present application is based on and claims the benefit of priority of Japanese Patent Application No. 2009-043906, filed on Feb. 26, 2009, the entire contents of which are incorporated herein by reference.

BACKGROUND OF THE INVENTION

1. Field of the Invention

The present invention relates generally to optical connectors, and more particularly to an optical connector to which a ferrule connected to an optical fiber is attached and in which an element that performs photoelectric conversion is provided.

2. Description of the Related Art

Conventionally, transmission lines adopted as international standard interfaces in standards such as 10GFC and 10 GBASE-CX4 are subject to restraints such as being as short in transmission distance as approximately 20 m. In response, optical connectors have been proposed that increase transmission distance by combining a high-speed transmission line using one of such interfaces and an optical transmission line.

Most conventional optical connectors use an edge-emitting diode as a photoelectric conversion element. This edge-emitting diode, which consumes a large amount of power and is expensive, has been replaced with a vertical-cavity surface-emitting laser (VCSEL) of late. (See, for example, Japanese Laid-Open Patent Application No. 2006-309113.)

The VCSEL is lower in cost and power consumption than the edge-emitting diode. Further, the light emission of the VCSEL is perpendicular to the surface of a board on which the VCSEL is mounted, which facilitates two-dimensional arrangement on the board.

However, while being advantageous as described above, using the VCSEL as a photoelectric conversion element has the following problem. That is, while a ferrule connected to an optical fiber is attached to the optical connector in a direction parallel to the board, the VCSEL emits light in a direction perpendicular to the board surface as described above. This requires the optical path of the light emitted from the VCSEL to make a substantially right-angled turn for the emitted light to enter the optical fiber.

Therefore, according to the optical connector described in Japanese Laid-Open Patent Application No. 2006-309113, a waveguide array that causes the optical path of light emitted from the VCSEL to make a substantially right-angled turn is provided on a board.

SUMMARY OF THE INVENTION

According to an aspect of the present invention, an optical connector includes an optical element to be optically connected to an optical fiber; and an optical component, the optical component including an element fixation part configured to fix the optical element to the optical component; a ferrule attachment part to which a ferrule having the optical fiber connected thereto is to be attached; and a lens to face the optical fiber when the ferrule is attached to the ferrule attachment part, wherein the optical element is positioned relative to the optical fiber in response to attachment of the ferrule to the ferrule attachment part.

The object and advantages of the embodiment will be realized and attained by means of the elements and combinations particularly pointed out in the claims.

It is to be understood that both the foregoing general description and the following detailed description are exemplary and explanatory and not restrictive of the invention as claimed.

BRIEF DESCRIPTION OF THE DRAWINGS

Other objects, features and advantages of the present invention will become more apparent from the following detailed description when read in conjunction with the accompanying drawings, in which:

FIG. 5A is a partially cross-sectional plan view of the optical connector to which the ferrule is connected according to the second embodiment of the present invention;

DETAILED DESCRIPTION OF THE PREFERRED EMBODIMENTS

However, according to the conventional optical connector as described in Japanese Laid-Open Patent Application No. 2006-309113, it is desirable to position the waveguide array with high accuracy relative to a VCSEL mounted on the board in attaching the waveguide array, and also to attach an optical fiber (a ferrule) to the waveguide array with high accuracy.

Therefore, there is a problem in that it is troublesome to attach the waveguide array to the board, and also in that misalignment is likely to be caused between the VCSEL and the optical fiber after the attachment of the optical fiber so that there may be a reduction in transmission efficiency.

A description is given below, with reference to the accompanying drawings, of embodiments of the present invention.

[a] First Embodiment

Figure 1:
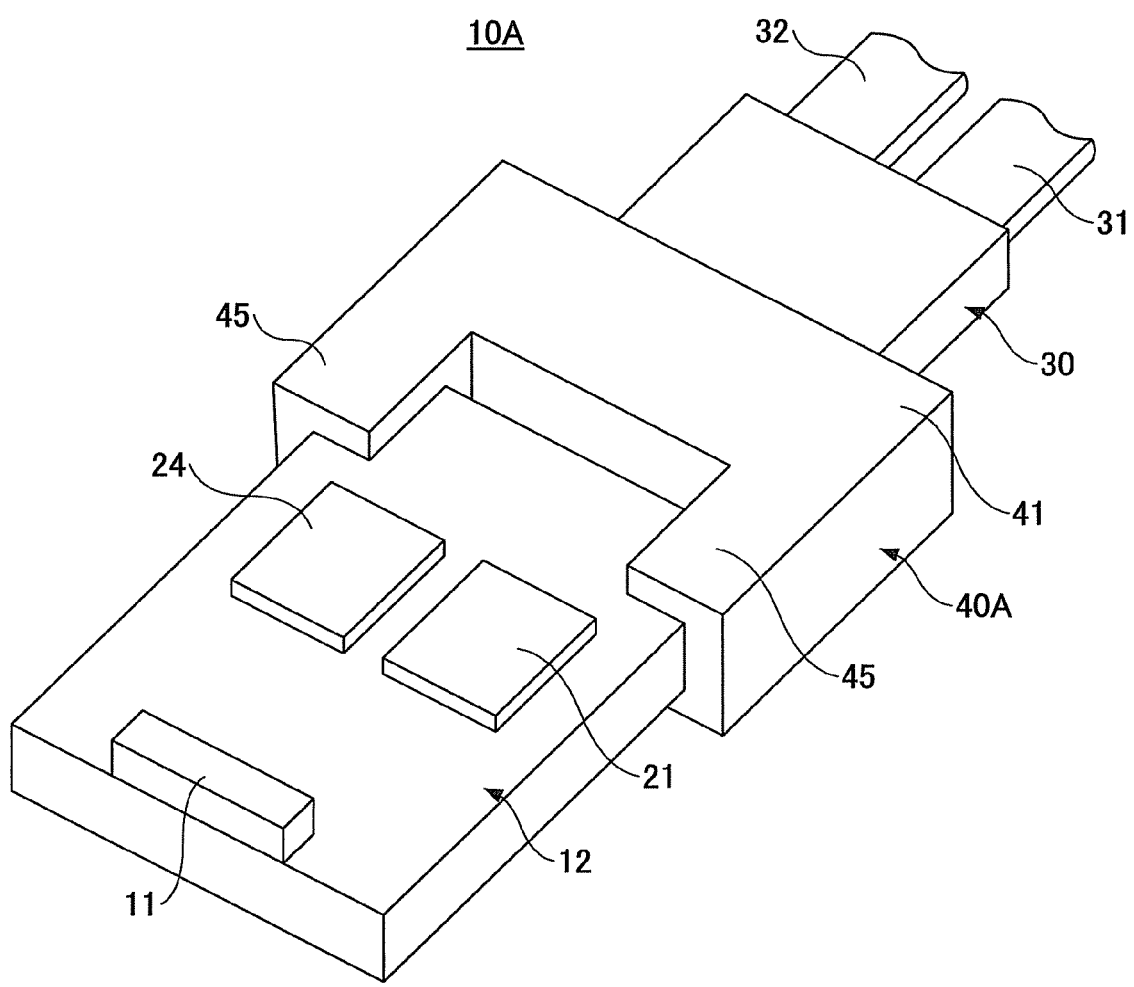
FIG. 1 is a perspective view of an optical connector, to which a ferrule is connected, according to a first embodiment of the present invention.
Figure 2A:
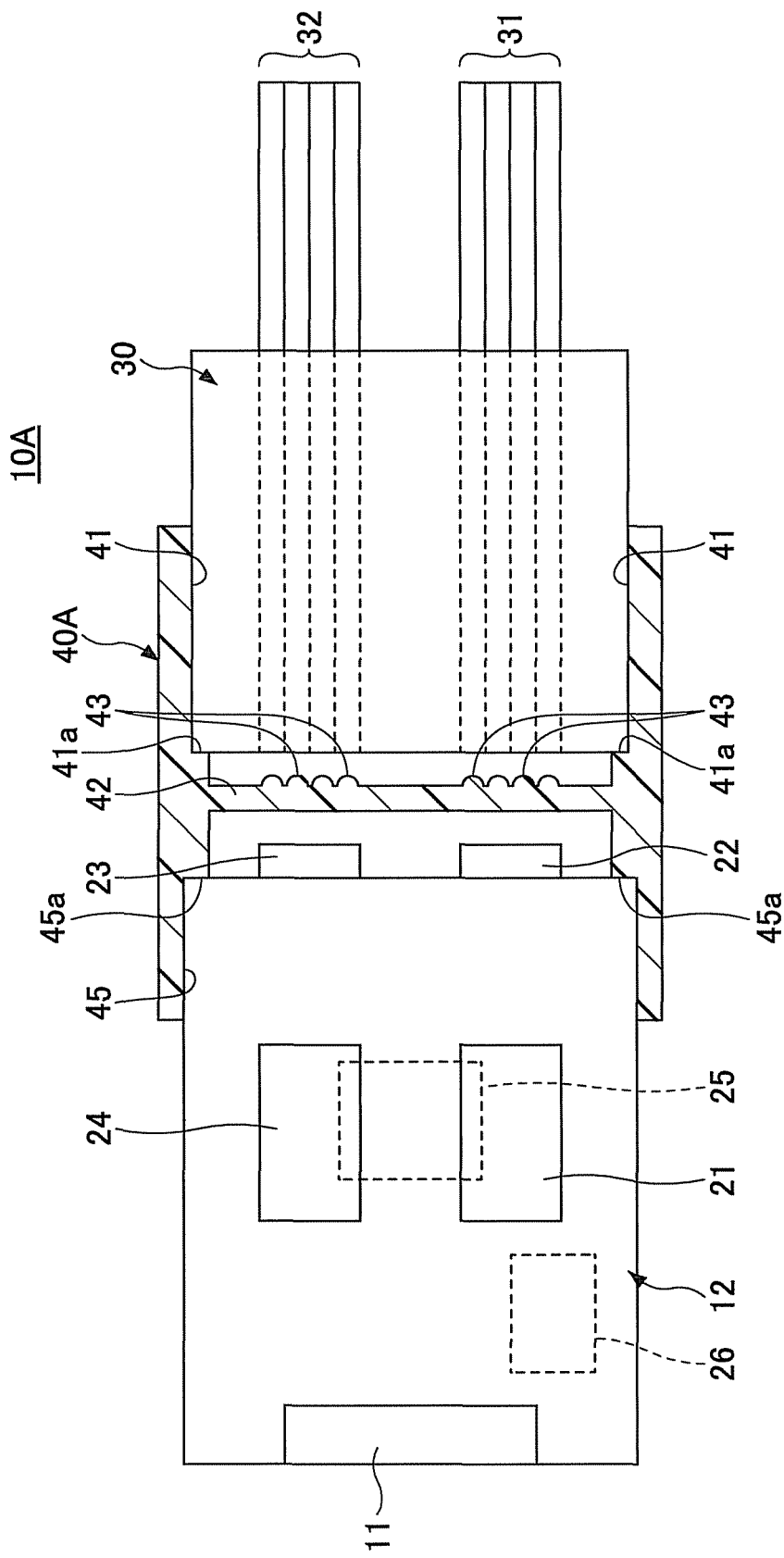
FIG. 2A is a partially cross-sectional plan view of the optical connector to which the ferrule is connected according to the first embodiment of the present invention.
Figure 2B:
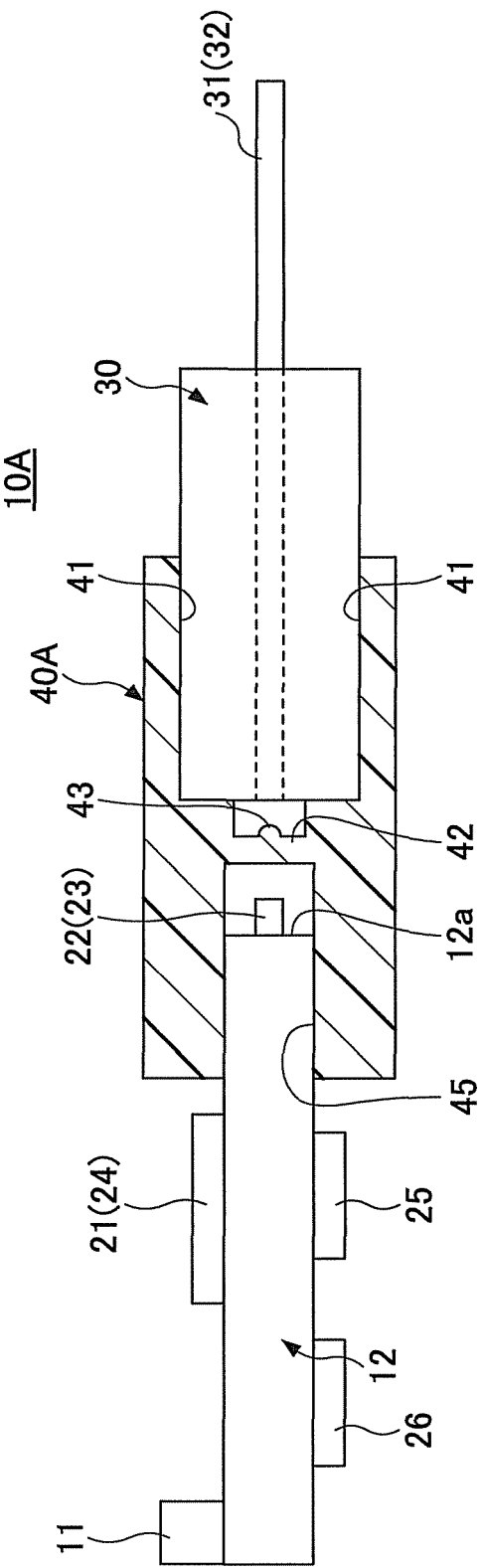
FIG. 2B is a partially cross-sectional side view of the optical connector to which the ferrule is connected according to the first embodiment of the present invention.

FIG. 1 and FIGS. 2A and 2B are diagrams for illustrating an optical connector 10A according to a first embodiment of the present invention.

FIG. 1 is a perspective view of the optical connector 10A, to which a ferrule 30 is connected. FIG. 2A is a partially cross-sectional plan view of the optical connector 10A to which the ferrule 30 is connected, and FIG. 2B is a partially cross-sectional side view of the optical connector 10A to which the ferrule 30 is connected.

The optical connector 10A includes a light-emitting element 22 and a light-receiving element 23 as optical elements, and an optical component 40A. The light-emitting element 22 includes a vertical-cavity surface-emitting laser diode (hereinafter referred to as "VCSEL"). The light-emitting element 22 includes multiple (four in this embodiment) light-emitting parts in alignment. Using the VCSEL as the light-emitting element 22 makes it possible to reduce cost and power consumption as described above. Further, the light-receiving element 23, which is a photodiode (PD), includes multiple (four in this embodiment) light-receiving parts in alignment.

The optical component 40A is a resin molded article formed by monolithically molding transparent resin using a molding method. Molding allows highly accurate shape forming, thus making it possible to form the optical component 40A with high accuracy (within ±5 µm). Further, examples of the resin material of the optical component 40A include olefin resin and acrylic resin. The optical component 40A includes a ferrule attachment part 41, a light guide wall 42, and a board attachment part 45.

The ferrule attachment part 41 is where the ferrule 30 is attached. The ferrule attachment part 41 includes a step part 41a that restricts the position of insertion of the ferrule 30. When being inserted in and attached to the optical component 40A, the ferrule 30 is in contact with the inner wall of the ferrule attachment part 41 on four sides, and has its end part in contact with the step part 41a, so that the ferrule 30 is positioned inside the optical component 40A.

The ferrule 30 includes multiple optical fibers 31 and multiple optical fibers 32. Laser light emitted from the light-emitting element 22 enters the optical fibers 31. Laser light emitted toward the light-receiving element 23 is transmitted through the optical fibers 32. According to this embodiment, the number of optical fibers 31 and the number of optical fibers 32, which correspond to the number of light-emitting parts of the light-emitting element 22 and the number of light-receiving parts of the light-receiving element 23, respectively, are four.

The board attachment part 45 is where a circuit board 12 is attached. The board attachment part 45 includes a step part 45a that restricts the position of insertion of the circuit board 12. When being fixed to the optical component 40A, the circuit board 12 is fit to the inner wall of the board attachment part 45 on four sides, and has its end part in contact with the step part 45a, so that the circuit board 12 is positioned and fixed inside the optical component 40A.

The circuit board 12 includes, for example, a multilayer ceramic substrate. The circuit board 12 has an electrical connector 11, a driver IC 21, and a receiver IC 24 provided on its top (upper) side and has a microcomputer 25 and a power supply circuit 26 provided on its bottom (lower) side. Further, the circuit board 12 has the light-emitting element 22 and the light-receiving element 23 provided on a side end face 12a (FIG. 2B) (an end face on the side facing toward the ferrule attachment part 41).

The optical axis of each of the light-emitting element 22 and the light-receiving element 23 is designed to be perpendicular to the side end face 12a. Some of the internally provided interconnects may be pulled out onto the side end face 12a of the multilayer circuit board 12, and the light-emitting element 22 and the light-receiving element 23 are electrically connected to the pulled-out interconnects. The light-emitting element 22 and the light-receiving element 23 may be fixed to the circuit board 12 through soldering to the interconnects or using an adhesive agent.

The electrical connector 11 is provided at the left end on the top side of the circuit board 12 in FIG. 2. Connection pads (not graphically illustrated) are formed where the electrical connector 11 is provided on the circuit board 12. The electrical connector 11 is fixed to the connection pads by soldering. The connection pads are connected to the driver IC 21, the receiver IC 24, the microcomputer 25, and the power supply circuit 26 through differential transmission line patterns (not graphically illustrated). The differential transmission line patterns are connected to the driver IC 21, the receiver IC 24, the microcomputer 25, and the power supply circuit 26 through one or more intermediate layers of the circuit board 12 via through holes (not graphically illustrated).

The differential transmission line patterns have their routes adjusted in one or more intermediate layers of the circuit board 12. For example, the differential transmission line patterns have their routes adjusted so that the wiring distance from the pads to the driver IC 21 is substantially equal to the wiring distance from the pads to the receiver IC 24. This makes it possible to make transmission characteristics uniform between the differential transmission line pattern for transmission and the differential transmission line pattern for reception.

Figure 3:
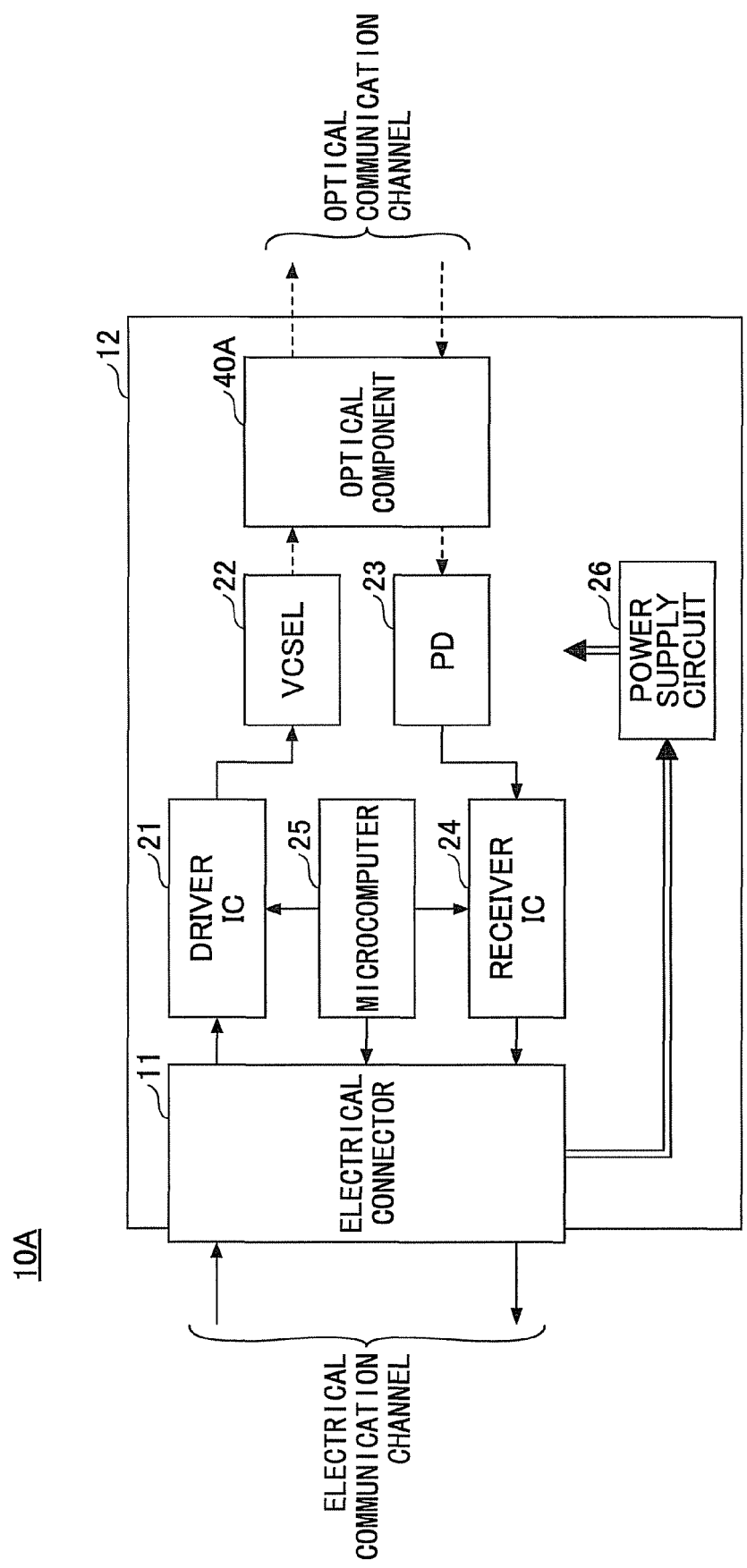
FIG. 3 is a block diagram illustrating a circuit configuration of the optical connector according to the first embodiment of the present invention.

FIG. 3 is a block diagram illustrating a circuit configuration of the optical connector 10A. In FIG. 3, a solid-line arrow indicates an electronic communication channel, and a broken-line arrow indicates an optical communication channel.

Referring to FIG. 3, the driver IC 21, the receiver IC 24, the microcomputer 25, and the power supply circuit 26 are connected to the electrical connector 11. Further, the driver IC 21 is connected to the light-emitting element 22, and the receiver IC 24 is connected to the light-receiving element 23. Further, the microcomputer 25 is connected to the driver IC 21 and the receiver IC 24 to control the driving of the driver IC 21 and the receiver IC 24.

The driver IC 21, which is connected to the light-emitting element 22, drives the light-emitting element 22 in accordance with a signal fed through the electrical connector 11. Further, the receiver IC 24 amplifies an electrical signal fed from the light-receiving element 23 and feeds the amplified electrical signal to the electrical connector 11 through the differential transmission line pattern. The driver IC 21 is placed in proximity to the light-emitting element 22, and the receiver IC 21 is placed in proximity to the light-receiving element 23.

Further, the power supply circuit 26 supplies power to the driver IC 21 and the receiver IC 24 on the other side as well as to the light-emitting element 22 and the light-receiving element 23. The microcomputer 25 controls the driver IC 21 and the receiver IC 24 to control the condition of reception and the condition of laser output, thereby stabilizing communications.

Referring back again to FIG. 1 and FIGS. 2A and 2B, the light guide wall 42 is formed between the ferrule attachment part 41 and the board attachment part 45, which are configured as described above, in the optical component 40A. This light guide wall 42 separates the ferrule attachment part 41 and the board attachment part 45 inside the optical component 40A. As described above, the optical component 40A is formed of transparent resin. Accordingly, the light guide wall 42 is also transparent and transmits light.

Lenses 43 are integrated with the light guide wall 42 on its face facing the ferrule attachment part 41. The lenses 43 are designed to face the optical fibers 31 and the optical fibers 32 so that the optical axes of the lenses 43 are aligned with the optical axes of the corresponding optical fibers 31 and 32 when the ferrule 30 is attached to the ferrule attachment part

41. Further, the circuit board 12 is fixed to the board attachment part 45. As described above, the light-emitting element 22 and the light-receiving element 23 are provided on the side end face 12a, which faces the light guide wall 42, of the circuit board 12.

Therefore, as a result of fixation of the circuit board 12 to the board attachment part 45, the light-emitting element 22 and the light-receiving element 23 also are fixed. That is, the circuit board 12 on which the light-emitting element 22 and the light-receiving element 23 are provided and the board attachment part 45 to which the circuit board 12 is attached serve as an element fixation part to fix the light-emitting element 22 and the light-receiving element 23 to the optical component 40A.

Here, a description is given of the accuracy of the positions of the optical fibers 31 and 32, the lenses 43, the light-emitting element 22, and the light-receiving element 23 when the ferrule 30 is attached to the optical component 40A as described above. As described above, the optical component 40A is formed using molding, so that the ferrule attachment part 41, the lenses 43, and the board attachment part 45 of the optical component 40A are formed (molded) with high accuracy. Further, the circuit board 12 includes a ceramic substrate, which is less likely to be distorted or warp. Further, the ferrule 30 also is formed with high accuracy. The accuracy of each of these configurations is within ±5 µm.

Accordingly, it is possible to position the elements 22 and 23, the optical fibers 31 and 32, and the lenses 43 relative to one another with high accuracy by simply attaching the ferrule 30 to the optical component 40A to which the circuit board 12 is fixed. This facilitates the positioning of the elements 22 and 23, the optical fibers 31 and 32, and the lenses 43 relative to one another, so that it is possible to improve the assembling efficiency of the optical connector 10A.

[b] Second Embodiment

Next, a description is given of a second embodiment according to the present invention.

Figure 4:
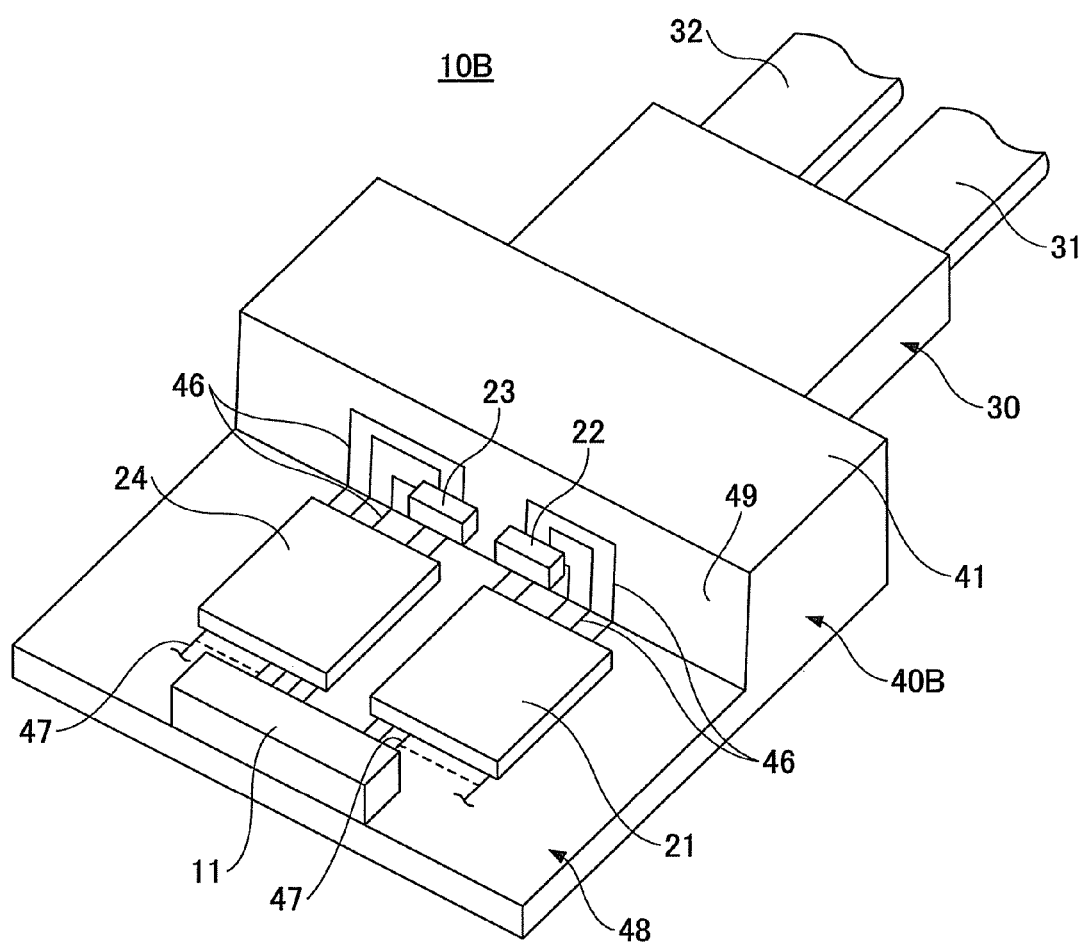
FIG. 4 is a perspective view of an optical connector, to which the ferrule is connected, according to a second embodiment of the present invention.
Figure 5B:
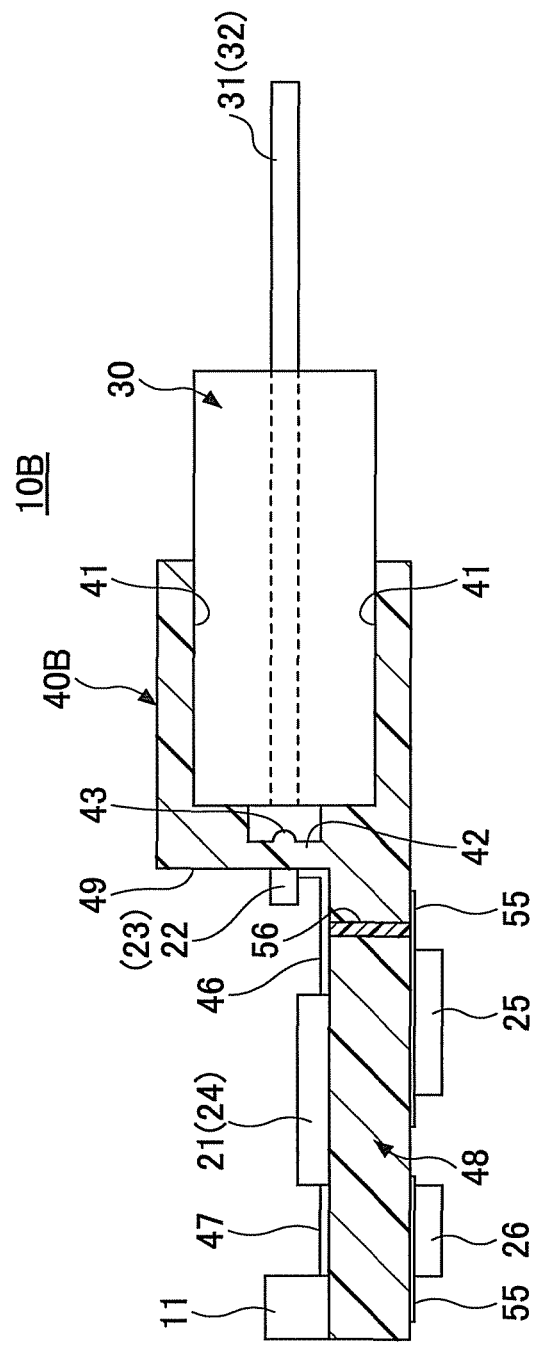
FIG. 5B is a longitudinal cross-sectional view of the optical connector to which the ferrule is connected according to the second embodiment of the present invention.

FIG. 4 and FIGS. 5A and 5B are diagrams for illustrating an optical connector 10B according to the second embodiment.

FIG. 4 is a perspective view of the optical connector 10B, to which the ferrule 30 is connected. FIG. 5A is a partially cross-sectional plan view (sectioned at the ferrule attachment part 41) of the optical connector 10B to which the ferrule 30 is connected, and FIG. 5B is a longitudinal cross-sectional view of the optical connector 10B to which the ferrule 30 is connected. In FIG. 4 and FIGS. 5A and 5B, elements corresponding to those illustrated in FIG. 1 through FIG. 3 are referred to by the same reference numerals, and a description thereof is omitted.

In the first embodiment, the circuit board 12 is fixed to the optical component 40A, and elements or components such as the electrical connector 11, the driver IC 21, the light-emitting element 22, the light-receiving element 23, and the receiver IC 24 are mounted on the circuit board 12. On the other hand, the optical connector 10B of this embodiment does not use the circuit board 12, and uses an optical component 40B as a board for mounting elements or components such as the electrical connector 11, the driver IC 21, the light-emitting element 22, the light-receiving element 23, and the receiver IC 24.

Like the optical component 40A according to the first embodiment, the optical component 40B used in this embodiment is formed by monolithically molding transparent resin using a molding method. The optical component 40B, which is monolithically formed, includes the ferrule attachment part 41, the light guide wall 42, and a board part 48. Further, as illustrated in FIG. 4 and FIG. 5B, the vertical dimension (height) of the ferrule attachment part 41 is larger than the vertical dimension (height or thickness) of the board part 48. As a result, a standing wall 49 (a wall part), standing relative to the board part 48, is formed at the boundary between the ferrule attachment part 41 and the board part 48. The standing wall 49 may include the light guide wall 42.

Interconnects (interconnection lines) 46 are formed on the board part 48 and the standing wall 49, and interconnects (interconnection lines) 47 are formed on the board part 48. The interconnects 46 connect the driver IC 21 and the receiver IC 24 to the light-emitting element 22 and the light-receiving element 23, respectively. Further, the interconnects 47 connect the driver IC 21 and the receiver IC 24 to the electrical connector 11.

The interconnects 46 and 47 are conductive metal lines provided on the board part 48 and the standing wall 49 using insert molding at the time of molding the optical component 40B. The interconnects 46 and 47 are formed to be exposed on the board part 48 and the standing wall 49.

Further, the interconnects 46 are provided continuously over the board part 48 and the standing wall 49, which is formed at the boundary between the ferrule attachment part 41 and the board part 48 as described above. In order to thus provide the interconnects 46 continuously along the board part 48 and the standing wall 49 perpendicular to each other, the interconnects 46 (conductive metal lines) bent at a right angle in advance may be attached to a mold for molding the optical component 40B, and insert molding may be performed using the mold.

Further, interconnects (interconnection lines) 55 are formed also on the bottom (lower) side of the board 48. The electrical connector 11 is connected to the microcomputer 25 and the power supply circuit 26 using the interconnects 55. Further, the interconnects 47 provided on the top (upper) side of the board part 48 and the interconnects 55 formed on the bottom side of the board part 48 are connected via through electrodes 56 formed through the board part 48.

The light-emitting element 22 and the light-receiving element 23 used in this embodiment are configured to allow flip-chip mounting or flip-chip bonding. The light-emitting element 22 and the light-receiving element 23 are flip-chip mounted on the corresponding interconnects 46 formed on the standing wall 49.

As a result, the light-emitting element 22 and the light-receiving element 23 are fixed to the optical component 40B. That is, according to this embodiment, the standing wall 49, formed as an integral part of the monolithic optical component 40B, and the interconnects 46 formed on the standing wall 49 serve as an element fixation part to fix the light-emitting element 22 and the light-receiving element 23 to the optical component 40B.

The light-emitting element 22 and the light-receiving element 23 may be flip-chip mounted on the interconnects 46 formed on the standing wall 49 using a flip-chip mounter used in mounting a semiconductor device on a board by flip-chip mounting. The flip-chip mounter includes a handling unit, which allows semiconductor devices (the light-emitting element 22 and the light-receiving element 23 in this embodiment) to be positioned with high accuracy where they are to be mounted. Therefore, it is possible to fix the light-emitting element 22 and the light-receiving element 23 to the standing wall 49 with high accuracy by mounting them by flip-chip mounting using a flip-chip mounter.

According to this embodiment, the lenses 43 are formed on the side of the standing wall 49 where the ferrule attachment part 41 is formed. The lenses 43 are an integral part of the monolithic optical component 40B. Accordingly, the lenses 43 are formed with high accuracy. The light-emitting element 22 and the light-receiving element 23 are flip-chip mounted on the standing wall 49 with accuracy so that the optical axes of the light-emitting element 22 and the light-receiving element 23 are aligned with the optical axes of the lenses 43.

Further, the light-emitting element 22 and the light-receiving element 23 according to this embodiment, which are flip-chip mounted, have their respective light-emitting surface and light-receiving surface on the mounting surface side. Therefore, the light-emitting element 22 and the light-receiving element 23 are flip-chip mounted on the standing wall 49 to emit light toward the light guide wall 42 and receive light transmitted through the light guide wall 42, respectively.

Here, a description is given of the accuracy of the positions of the optical fibers 31 and 32, the lenses 43, the light-emitting element 22, and the light-receiving element 23 when the ferrule 30 is attached to the optical component 40B as described above. Since the optical component 40B also is monolithically formed using molding, the ferrule attachment part 41, the lenses 43, the board part 48, and the standing wall 49 of the monolithic optical component 40B are formed (molded) with high accuracy. The interconnects 46, to which the light-emitting element 22 and the light-receiving element 23 are flip-chip bonded (joined), are provided on the optical component 40B by insert molding. Therefore, it is possible to provide the interconnects 46 with high accuracy. Further, the ferrule 30 also is formed with high accuracy. The accuracy of each of these configurations also is within ±5 μm.

Accordingly, it is possible to position the elements 22 and 23, the optical fibers 31 and 32, and the lenses 43 relative to one another with high accuracy by simply attaching the ferrule 30 to the optical component 40B where the elements 22 and 23 are fixed to the standing wall 49. Therefore, according to this embodiment as well, the positioning of the elements 22 and 23, the optical fibers 31 and 32, and the lenses 43 relative to one another is facilitated, so that it is possible to improve the assembling efficiency of the optical connector 10B.

[c] Third Embodiment

Next, a description is given of a third embodiment according to the present invention.

Figure 6:
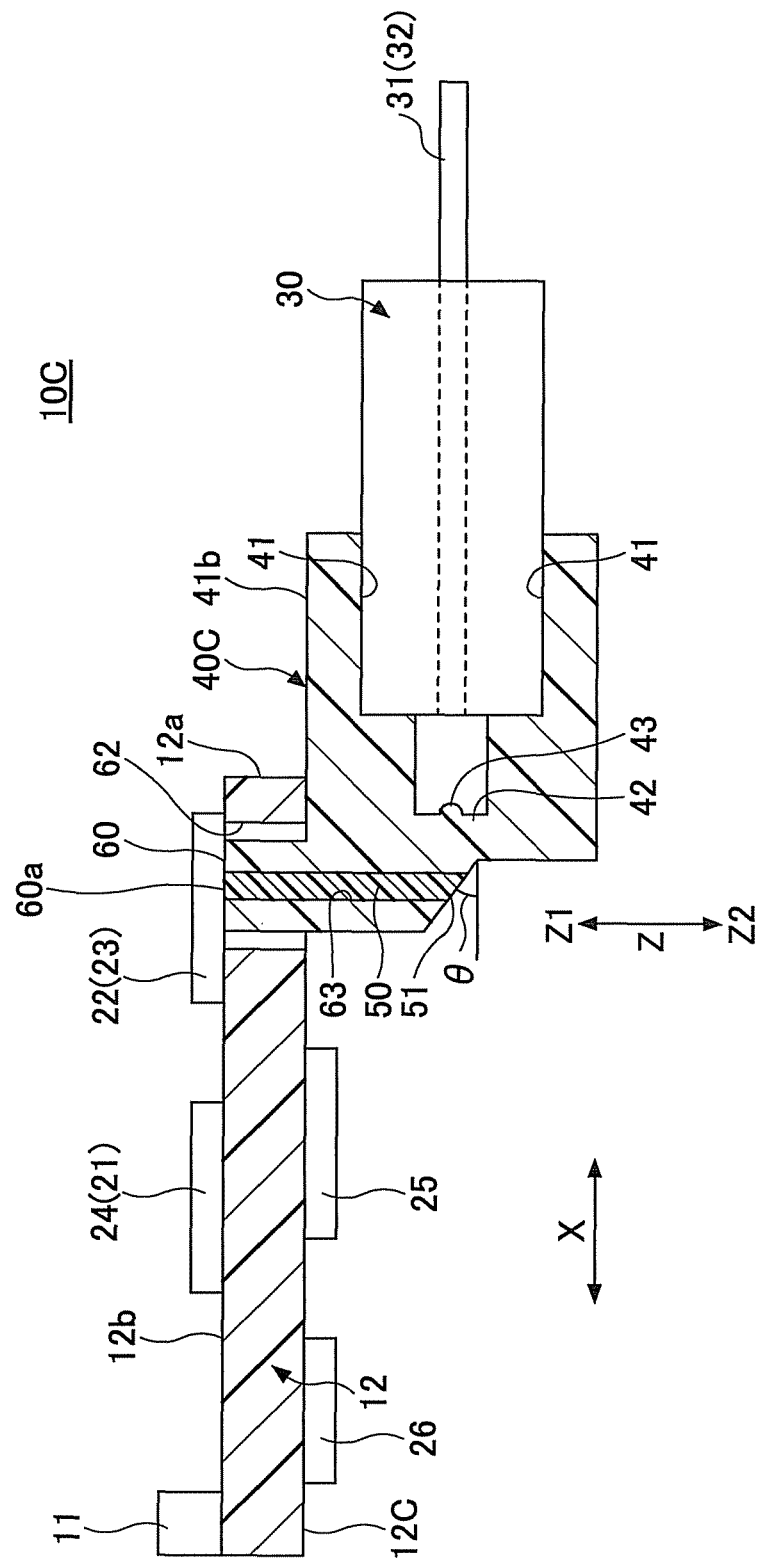
FIG. 6 is a cross-sectional view of an optical connector according to a third embodiment of the present invention.

FIG. 6 is a cross-sectional view of an optical connector 100 according to the third embodiment. In FIG. 6, elements corresponding to those illustrated in FIG. 1 through FIG. 3 are referred to by the same reference numerals, and a description thereof is omitted.

Like the optical connector 10A of the first embodiment, the optical connector 100 of this embodiment employs the circuit board 12. According to this embodiment, however, the light-emitting element 22 and the light-receiving element 23 are mounted on the circuit board 12 by flip-chip mounting. Further, a through hole 62 is formed in the circuit board 12 where the circuit board 12 faces the light-emitting part of the light-emitting element 22 and the light-receiving part of the light-receiving element 23.

Like the optical component 40A of the first embodiment, the optical component 40C includes the ferrule attachment part 41 for attaching the ferrule 30. Further, the lenses 43 are formed at positions to face the optical fibers 31 and 32 with the ferrule 30 attached. The optical component 40C of this embodiment, however, is different from the optical component 40A of the first embodiment in further including optical waveguides 50 and prism parts 51.

The optical waveguides 50 are formed to extend in directions (indicated by double-headed arrow Z in FIG. 6) perpendicular to directions (indicated by double-headed arrow X in FIG. 6) in which the optical axes of the optical fibers 31 and 32 extend with the ferrule 30 attached to the ferrule attachment part 41. The optical waveguides 50 are formed as follows. First, holes 63 are formed in the Z directions where the optical waveguides 50 are to be formed by processing a structure (the optical component 40C before forming the optical waveguides 50) formed by molding. The holes 63 are, for example, 50 μm to 100 μm in diameter. This diameter allows the holes 63 to be formed with high accuracy using a micropore processor.

Next, the holes 63 are filled with an ultraviolet (UV) curable resin higher in refractive index than the material of the optical component 40C. The holes 63, which are as small in diameter as 50 μm to 100 μm as described above, are smoothly filled with the UV curable resin because of capillarity. After completion of the filling operation, the UV curable resin is exposed to ultraviolet radiation to be hardened, so that the optical waveguides 50 are formed in the optical component 40C.

Further, end faces 60a of the respective optical waveguides 50 on the Z1 direction side are made flat with high accuracy by polishing. Further, the end faces of the respective optical waveguides 50 on the Z2 direction side are inclined planes, inclined 45 degrees to the above-described X directions (in which the optical axes of the optical fibers 31 and 32 extend), so as to form the prism parts 51.

The positions where the prism parts 51 are formed are determined so that the optical axes of the optical fibers 31 and 32 and the optical axes of the optical waveguides 50 cross at right angles at the prism parts 51. The prism parts 51 optically connect the optical waveguides 50 and the optical fibers 31 and 32 provided in the ferrule 30 by turning the optical paths of light passing through the optical waveguides 50.

On the other hand, the circuit board 12 is fixed on a fixation surface 41b (positioned at the top of the ferrule attachment part 41) of the optical component 40C. Part of the optical component 40C in which part the optical waveguides 50 are formed projects in the Z1 direction relative to the fixation surface 41b, so as to be inserted in the through hole 62 formed in the circuit board 12.

The part of the optical component 40C where the optical waveguides 50 are formed has an end face 60 (including the end faces 60a) on the Z1 side in contact with the light-emitting part and the light-receiving part of the light-emitting element 22 and the light-receiving element 23, respectively, flip-chip mounted on the circuit board 12. The positioning of the optical waveguides 50 and the light-emitting part and the light-receiving part of the light-emitting element 22 and the light-receiving element 23, respectively, relative to each other can be performed with high accuracy.

Here, a description is given of the accuracy of the positions of the optical fibers 31 and 32, the lenses 43, the light-emitting element 22, and the light-receiving element 23 when the ferrule 30 is attached to the optical component 40C in the optical connector 100 according to this embodiment.

Since the optical component 40C also is formed using molding, the ferrule attachment part 41, the lenses 43, and the prism parts 51 of the optical component 40C are formed (molded) with high accuracy. Further, the holes 63 for forming the optical waveguides 50 can be formed with high accuracy using a micropore processor, so that it is also possible to position the optical waveguides 50 and the elements 22 and 23 relative to each other with high accuracy. Therefore, it is possible to position the elements 22 and 23, the optical fibers 31 and 32, and the lenses 43 relative to one another with high accuracy by simply attaching the ferrule 30 to the optical component 40C. Therefore, according to this embodiment as well, the positioning of the elements 22 and 23, the optical fibers 31 and 32, and the lenses 43 relative to one another is facilitated, so that it is possible to improve the assembling efficiency of the optical connector 100.

[d] Fourth Embodiment

Next, a description is given of a fourth embodiment according to the present invention.

Figure 7:
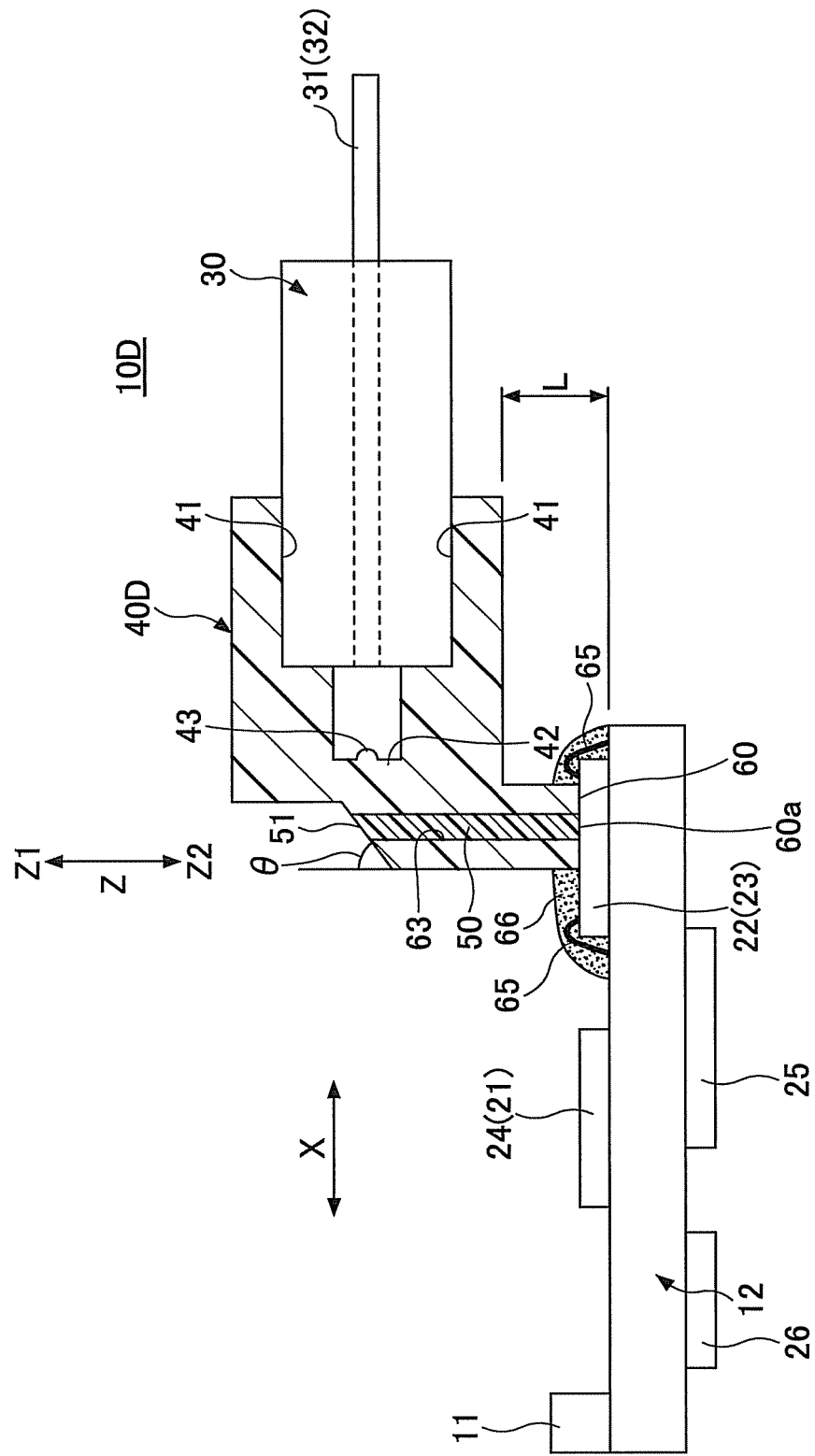
FIG. 7 is a cross-sectional view of an optical connector according to a fourth embodiment of the present invention.

FIG. 7 is a cross-sectional view of an optical connector 10D according to the fourth embodiment. In FIG. 7, elements corresponding to those illustrated in FIG. 1 through FIG. 3 and FIG. 6 are referred to by the same reference numerals, and a description thereof is omitted.

According to the above-described optical connector 100 of the third embodiment, the light-emitting element 22 and the light-receiving element 23 are flip-chip mounted on the circuit board 12. On the other hand, according to the optical connector 10D of this embodiment, the light-emitting element 22 and the light-receiving element 23 are mounted on the circuit board 12 in a face-up manner. Therefore, the light-emitting element 22 and the light-receiving element 23 are connected to the circuit board 12 using wires 65.

The optical connector 10D includes an optical component 40D. According to this embodiment, part of the optical component 40D in which part the optical waveguides 50 are formed projects in the Z2 direction relative to the position where the ferrule attachment part 41 is formed. The end face 60 of the part, which is on the Z2 side in this embodiment, is in contact with the light-emitting part and the light-receiving part of the light-emitting element 22 and the light-receiving element 23, respectively, mounted on the circuit board 12 in a face-up manner.

The positioning of the optical waveguides 50 and the light-emitting part and the light-receiving part of the light-emitting element 22 and the light-receiving element 23, respectively, relative to each other can be performed with high accuracy. The optical component 40D and the circuit board 12 are fixed by first positioning the part of the optical component 40D where the optical waveguides 50 are formed so that the part is in contact with the light-emitting part and the light-receiving part of the light-emitting element 22 and the light-receiving element 23, respectively, and then providing resin 66 to serve as an adhesive agent. At this point, the wires 65 also are sealed with the resin 66 for the protection of the wires 65.

According to the above-described optical connector 10D of this embodiment as well, it is possible to position the elements 22 and 23, the optical fibers 31 and 32, and the lenses 43 relative to one another with high accuracy by simply attaching the ferrule 30 to the optical component 40D. Therefore, the positioning of the elements 22 and 23, the optical fibers 31 and 32, and the lenses 43 relative to one another is facilitated, so that it is possible to improve the assembling efficiency of the optical connector 10D.

Further, compared with the optical connector 10C (FIG. 6) according to the third embodiment, in which the length of the part of the optical component 40C where the optical waveguides 50 are formed depends on the thickness of the circuit board 12 (the length of the through hole 62), the optical connector 10D of this embodiment allows the length (indicated by double-headed arrow L in FIG. 7) of the part of the optical component 40D in which the optical waveguides 50 are formed to be determined independently of the circuit board 12. This makes it possible to determine the position where the circuit board 12 is to be provided and the position where the ferrule 30 is to be attached as desired. This increases freedom in designing an apparatus on which the optical connector 10D is to be mounted.

All examples and conditional language recited herein are intended for pedagogical purposes to aid the reader in understanding the present invention and the concepts contributed by the inventor to furthering the art, and are to be construed as being without limitation to such specifically recited examples and conditions, nor does the organization of such examples in the specification relate to a showing of the superiority or inferiority of the present invention. Although the embodiment of the present invention has been described in detail, it should be understood that various changes, substitutions, and alterations could be made hereto without departing from the spirit and scope of the present invention.

For example, the circuit board 12 is not limited to a ceramic substrate, and may employ any other substrate as long as the substrate is less likely to be distorted or warp.

Further, in the above-described embodiments, the light-emitting elements 22 and the light-receiving elements 23 are provided as optical elements, while the present invention may also be applied to configurations where only one of the light-emitting elements 22 and the light-receiving elements 23 is provided.

Further, the method of processing the optical component 40A is not limited to molding, and any other manufacturing method may also be employed as long as the manufacturing method can achieve the accuracy required for the positioning.

Further, according to the above-described embodiments, the optical components 40A through 40D include the ferrule attachment part 41, which is a space for housing the ferrule 30, and the optical fibers 31 and 32 are positioned relative to the optical components 40A through 40D by causing the ferrule 30 to be housed in the ferrule attachment part 41. Alternatively, one or more positioning pins may be formed on the insertion-side surface of the ferrule 30, and one or more positioning holes corresponding to the one or more positioning pins may be formed in the optical components 40A through 40D, so that the optical fibers 31 and 32 may be positioned relative to the optical components 40A through 40D by inserting the positioning pins into the corresponding positioning holes.

According to an aspect of the present invention, an optical connector is provided that makes it possible to position an optical fiber and an optical element relative to each other with ease and high accuracy.

According to an aspect of the present invention, an optical element is fixed to an optical component through an element fixation part, and the optical component includes a ferrule attachment part to which a ferrule is to be attached. Therefore, the optical element and an optical fiber are positioned relative to each other with high accuracy by attaching the ferrule to the ferrule attachment part. Thus, the optical element and the optical fiber are positioned by simply attaching the ferrule to the ferrule attachment part. This simplifies positioning.

What is claimed is:

1. An optical connector, comprising:
   an optical element to be optically connected to an optical fiber; and
   an optical component, the optical component being a monolithically molded article of a transparent material, the optical component including
   a board attachment part into which a circuit board including a flat surface on which the optical element is provided is inserted, wherein the board attachment part includes a step part that is in contact with the flat surface of the circuit board;

a ferrule attachment part which a ferrule having the optical fiber connected thereto is to be inserted in and attached to; and a light guide wall that separates the board attachment part and the ferrule attachment part and includes a lens that faces the optical fiber when the ferrule is attached to the ferrule attachment part, wherein a position of the optical element relative to the optical fiber is fixed when the ferrule is attached to the ferrule attachment part, the optical element is fixed to the optical component by the insertion of the circuit board into the board attachment part, and the optical element is positioned inside a space defined by the step part, the flat surface of the circuit board, and the light guide wall.

2. The optical connector as claimed in claim 1, wherein the flat surface of the circuit board on which the optical element is provided is a side end face of the circuit board.

3. The optical connector as claimed in claim 1, wherein the transparent material is transparent resin.

4. The optical connector as claimed in claim 1, wherein the optical element includes a light-emitting element and a light-receiving element.

5. The optical connector as claimed in claim 4, wherein the light-emitting element is a vertical-cavity surface-emitting laser.

6. The optical connector as claimed in claim 1, wherein the light guide wall is configured to transmit at least one of light to and light from the optical element.

7. The optical connector as claimed in claim 1, wherein the ferrule is to be inserted in and attached to the ferrule attachment part so that side surfaces of the ferrule extending along the optical fiber come into contact with an inner wall of the ferrule attachment part.

8. The optical connector as claimed in claim 1, wherein the board attachment part further includes an inner wall surface that defines, with the step part, an insertion space inside the board attachment part, and the circuit board is inserted into the insertion space inside the board attachment part so that the circuit board is fit to the inner wall surface of the board attachment part on four sides of the circuit board and has an end part thereof in contact with the step part of the board attachment part.

9. An optical connector, comprising:

an optical element to be optically connected to an optical fiber; and an optical component, the optical component being a monolithically molded article of a transparent material, the optical component including an element fixation part configured to fix the optical element to the optical component;

a ferrule attachment part which a ferrule having the optical fiber connected thereto is to be inserted in and attached to; and a lens that faces the optical fiber when the ferrule is attached to the ferrule attachment part, wherein a position of the optical element relative to the optical fiber is fixed when the ferrule is attached to the ferrule attachment part, and the optical component further includes:

a waveguide in contact with the optical element; and a prism part configured to optically connect the waveguide and the ferrule by changing a direction of an optical path of light passing through the waveguide, wherein the prism part is formed so that an optical axis of the optical fiber and an optical axis of the waveguide cross at right angles at the prism part, and a refractive index of a material of the waveguide is higher than a refractive index of the transparent material of the optical component.

10. An optical connector, comprising:

an optical element to be optically connected to an optical fiber; and an optical component, the optical component being a monolithically molded article of a transparent material, the optical component including an element fixation part configured to fix the optical element to the optical component;

a ferrule attachment part which a ferrule having the optical fiber connected thereto is to be inserted in and attached to; and a lens that faces the optical fiber when the ferrule is attached to the ferrule attachment part, wherein a position of the optical element relative to the optical fiber is fixed when the ferrule is attached to the ferrule attachment part, the element fixation part includes:

a standing wall which the lens is formed on and the optical element is fixed to; and an interconnect formed on the standing wall, and the optical element is flip-chip bonded to the interconnect.

11. The optical connector as claimed in claim 10, wherein the optical element includes a light-emitting element and a light-receiving element, and the optical component further includes:

a driver IC configured to drive the light-emitting element; and a receiver IC configured to receive a signal from the light-receiving element.

* * * * *